UNITED STATES PATENT OFFICE.

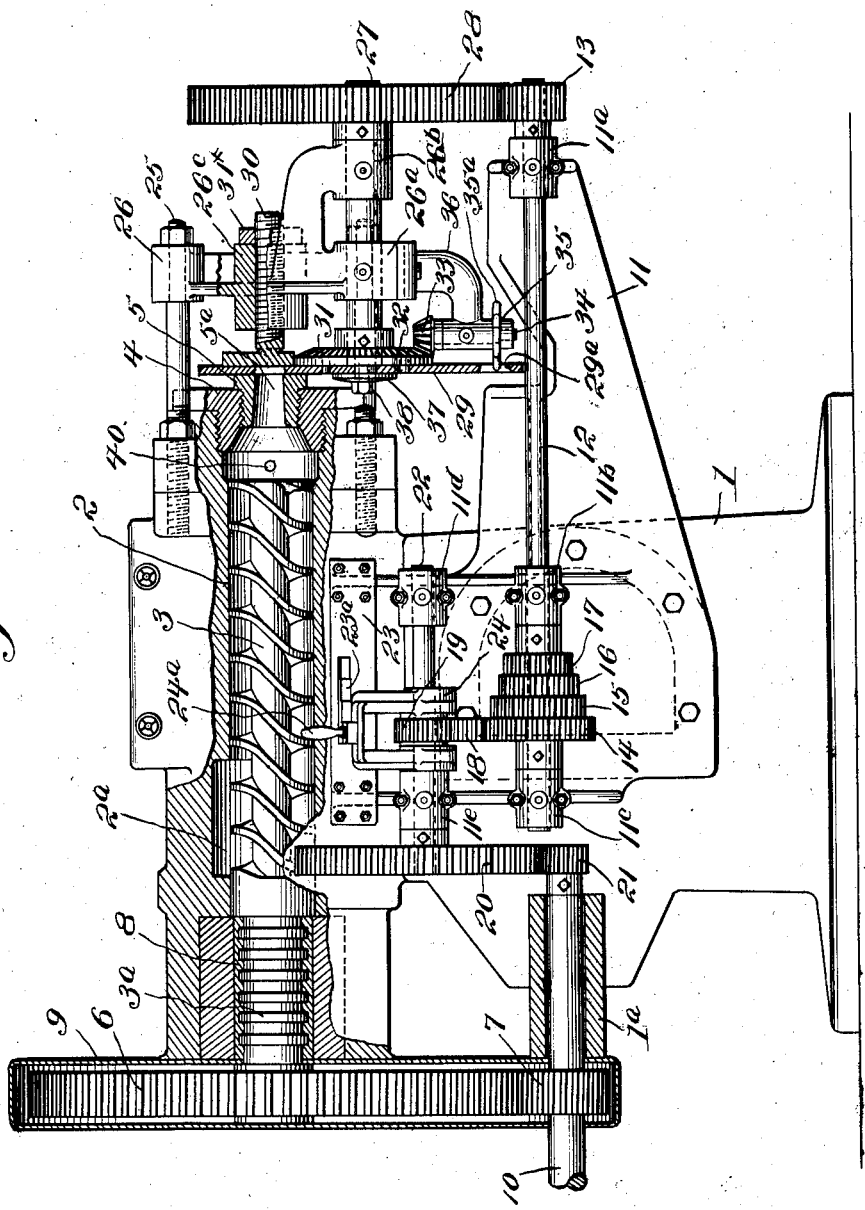

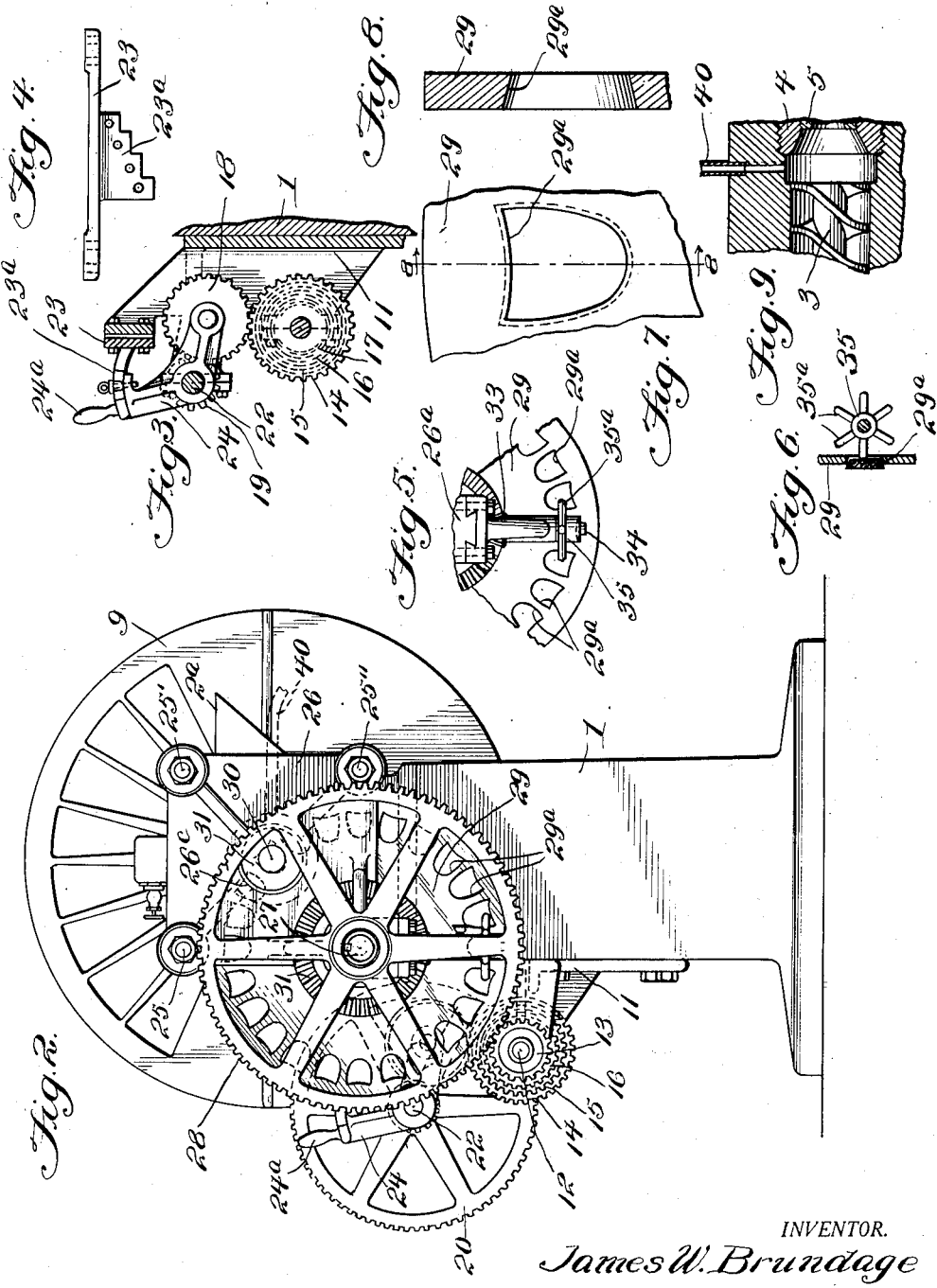

JAMES WILLIAM BRUNDAGE, OF AKRON, OHIO, ASSIGNOR TO THE MILLER RUBBER COMPANY, OF AKRON, OHIO, A CORPORATION OF OHIO.

BLANK-FORMING MACHINE.

1,338,120.　　　　　Specification of Letters Patent.　　Patented Apr. 27, 1920.

Application filed October 29, 1919. Serial No. 334,350.

*To all whom it may concern:*

Be it known that I, JAMES W. BRUNDAGE, a citizen of the United States, and resident of Akron, Ohio, have invented certain new and useful Improvements in Blank-Forming Machines, of which the following is a specification.

My invention relates to machines for forming blanks of rubber compounds or other plastic material to be used in the production of articles by the pressure molding process such as is used in forming articles of rubber composition.

My invention also relates to improvements in tubing machines such as are commonly used for extruding bars and tubes of rubber composition or other plastic material. As is well known in the art, molded rubber goods are made by placing a blank of predetermined volume and shape in a mold cavity having the conformation of the article to be produced, the mold which is made up in various parts is then assembled and placed between the coacting platens of a hydraulic press whereby pressure is exerted upon the mold to close it upon the blank causing the blank to flow and fill the mold cavity. The platens are heated usually by steam and the heat of the platens being conducted through the mold to the blank therein causes vulcanization to take place. After a sufficient time has elapsed to vulcanize the article to the desired degree the hydraulic pressure is removed, the mold disassembled and the article removed.

The molds are provided with overflow channels surrounding the article cavities and any excess of material is squeezed out between the mold sections and into the overflow channels where it is vulcanized and forms a rind or flash which must be trimmed from the molded article.

It will be easily seen that this rind is a waste of material as, being vulcanized it can not be used again in the production of like articles. It will also be readily seen that if the blank is of smaller volume than the mold cavity it will not completely fill said cavity and will not be maintained under the necessary pressure to produce a satisfactory article. It is, therefore, desirable to produce the blanks of such a volume as to exceed the volume of the mold cavity by a very small amount thereby eliminating defective articles and unnecessary vulcanized scrap material.

Prior to my invention these blanks have been formed either by cutting from a previously formed sheet of composition of proper thickness, a blank of the proper cross section or by first forming a bar of composition of the proper cross section and afterward cutting this bar transversely into blanks of the proper thickness. These methods have both proved to be costly and the blanks formed were so non-uniform in volume that before they could be used it was necessary to weigh each blank and trim it to the desired weight in order to obviate an excess of vulcanized scrap. By my present invention I am able to eliminate the trimming and weighing operation as the blanks produced thereby are practically uniform in volume.

My invention consists broadly of a tubing or extruding machine whereby a bar of the composition is extruded of the proper cross-section and is thereupon subdivided into predetermined lengths of the proper shape and volume to properly fill the mold cavities without subsequent weighing and trimming.

My invention also contemplates an attachment which may be placed upon the tubing machine as now manufactured so as to accomplish the subdividing operation to produce the same results.

In either of the aforesaid forms my invention consists in continuously or intermittently presenting before the die of a tubing machine and in contact therewith cavities of predetermined size and shape for the purpose of filling said cavities from said die, and upon intermittently or continuously removing said cavities after being filled together with the blanks therein.

My invention further contemplates means for holding the said cavities in contact with the surface of the die and means for removing the blanks from the cavities.

My invention further contemplates means for maintaining the velocity of the cavity carrying member in relation to the velocity of the pressure feeding screw which forces the material through the die at a fixed ratio, and means for varying said ratio at the will of the operator.

My invention further contemplates means for changing the mechanism of the machine for the purpose of producing blanks of different shapes and sizes.

My invention further includes means for relieving the tubing machine of excess pressure during the brief interval when one cavity of the rotary die plate is moving out of line with the die opening of the tube machine and a successive cavity is moving into position.

The machine of my invention may be of several forms, but for the purpose of illustration I will describe in detail a form of my invention which I have illustrated by the accompanying drawings. However, I do not wish to limit myself to this particular form of device. In the accompanying drawings in which like numerals indicate like parts—

Figure 1 is a side elevation of a tubing machine provided with attachments to accomplish the purpose of my invention, parts of the mechanism being broken away to show more clearly the construction, and Fig. 2 is a front elevation of the same.

Figs. 3 to 9 inclusive are views of details.

In the drawings the numerals 1 to 10 inclusive indicate the essential parts of the ordinary tubing machine as ordinarily manufactured. All other numerals indicate the parts of attachments made in accordance with my invention. The tubing machine may be described as a pedestal or frame 1 supporting a horizontal cylinder 2 for receiving the plastic material, a feeding screw 3 mounted in the cylinder 2 and provided with a driving gear 6 for rotating the screw, and a head 4 mounted on the front of the cylinder and supporting a removable die 5 through which the plastic material is forced by the screw. The cylinder 2 and head 4 are usually double walled so as to form a cavity for the reception of hot water or steam for warming the cylinder and die. The cylinder is also provided with a feeding part $2^a$ and a thrust bearing 8 in which an extension $3^a$ of the screw is journaled. The pedestal 1 is provided with a bearing $1^a$ for supporting a horizontal driving shaft 10 which carries a pinion 7 meshing with the gear 6, and a guard 9 surrounds pinion 7 and gear 6. The shaft 10 is driven from any suitable means such as a belt and pulleys from a source of power or directly from an electric motor. Pieces of the plastic material after being thoroughly mixed and while still warm are fed into the port $2^a$ and are mixed and conveyed by the screw to the opposite end of the cylinder, in the meantime undergoing compression from the screw and heating from the cylinder walls and also due to friction. The compressed plastic then passes through the die 5 which is fashioned in such a shape as to produce the desired shape of bar. The material leaving the die is always larger in area than the die opening and different in shape especially if the die is other than circular in shape.

Having described the construction and operation of the ordinary tubing machine I will now describe the attachments by which I accomplish additional results to those obtained by the tubing machine alone.

Again referring to the drawings, I mount a plate casting 26 or supplemental frame member parallel to the head 4 of the tubing machine and in horizontal alinement therewith but spaced therefrom and having a central, internally threaded, boss $26^c$ opposite the opening $5^a$ in the die 5. The plate casting 26 is rigidly supported by special studs 25, 25', 25'' which replace the bolts regularly used to clamp the head 4 of the tubing machine to the cylinder 2. The plate 26 is also provided with bearings $26^a$, $26^b$ which rotatably support a shaft 27 in parallel relation to the cylinder of the tubing machine. Shaft 27 rigidly carries a spur gear 28 at its outer extremity and a bevel gear 31 at its inner extremity. Bevel gear 31 carries dowel pins 32 by means of which a circular plate or disk 29 is mounted thereon. Plate 29 is also held in contact with gear 31 by means of a collar 37 and tap bolt 38. Plate 29 is of such diameter as to cover the opening $5^a$ in the die 5 and has a number of annularly arranged openings $29^a$ evenly spaced from its center and in line with the opening $5^a$. Plate 29 is mounted for rotation in sliding engagement with the face of the die 5 and the openings therein may be considered as interchangeable extensions of the die 5. Plate 26 supports a threaded stop 30 mounted in the central threaded boss $26^c$ and locked in final adjustment by a nut $30^x$. The stop 30 is adjusted so as to be in sliding engagement with the plate 29.

In the operation of the machine plate 29 is revolved either continuously as shown, or intermittently in contact with the die 5 so that the openings 29 are consecutively brought in line with the die opening $5^a$ where they are successively filled with the plastic material and are then moved out of line with said opening thereby severing the blank from the mass of plastic material. The plate openings $29^a$ are made of such shape and size as the blanks require, and the plate is made of the thickness as of the desired blanks. The plate 29 may be removed by removing the nut 38 and then moving shaft 27 endwise, means being provided for such movement. Other plates may then be substited having openings of different size or shape or plates of different thickness. Openings $29^a$ are preferably made tapering to facilitate in the removal of the blanks. The die opening 5ª may be of any convenient size and need not be the shape of the openings 29ª and may also be changed by removing the member 5 and replacing it with one having a different sized opening.

Means are provided for driving the plate 29 at a fixed ratio to the speed of the screw 3 and for varying said ratio when desired and these means are as follows:

A frame 11 bolted to pedestal 1 is formed with bearings 11ª, 11ᵇ, 11ᶜ, 11ᵈ and 11ᵉ. A shaft 12 is freely journaled in bearings 11ª, 11ᵇ and 11ᶜ and carries rigidly fastened thereto a pinion 13 and stepped gears 14, 15, 16 and 17. Pinion 13 meshes with gear 28. Bearings 11ᵈ and 11ᵉ support a freely rotating shaft 22 which carries a gear 20 rigidly mounted upon one end in such a position as to mesh with a pinion 21 rigidly mounted on the main drive shaft 10. The shaft 22 receives motion from the shaft 10 through gear 20 and pinion 21. Mounted upon shaft 22 is a yoke 24 slidable and rotatable thereon. Slidably mounted on shaft 22 between the arms of yoke 24 is a pinion 19 splined to shaft 22 by a feather key in engagement with a keyway in the shaft 22 for the purpose of driving said pinion. An idler gear 18 is mounted for rotation upon yoke 24 in mesh with pinion 19. Yoke 24 carries a handle 24ª by means of which it may be rocked on shaft 22 and moved endwise thereon so that pinion 18 may be brought into driving engagement with any of the gears 14, 15, 16 or 17 thus constituting a stepped speed transmission for regulating the velocity of plate 29. A plate 23 supported by frame 11 carries a series of stops 23ª for abutting engagement with yoke 24 to allow pinion 18 to only mesh the proper depth in gears 14, 15, 16 and 17 respectively.

Means are also provided to remove the formed blanks from the plate 29 as follows:

Gear 31 previously mentioned drives a pinion 33 mounted on a vertically disposed shaft 34. Shaft 34 also carries a spider or star wheel 35, the points 35ª of which register with opening 29ª during the revolution of plate 29 and entering said openings act to push out the blanks. The ratio of the number of points 35ª to the openings 29ª being the same as that of the number of teeth in gear 31 and pinion 33. Shaft 34 is mounted for rotation in a bracket 36 which is dovetailed to bearing 26ª on plate 26 and locked thereto by bolts entering slots in bracket 36. Bracket 36 may thus be moved in a direction parallel to shaft 27 carrying pinion 33 and star wheel 35 therewith when it is desired to remove plate 29. Shaft 27 is also free to move endwise for such removal after bracket 36 has been moved away.

In order to relieve the tube machine of excess pressure during the time intervening between the presentation of successive openings in the plate, I provide a by-pass 40 the pressure being relieved by the forcing of the rubber through the by-pass.

I prefer to have the by-pass constantly open so that the gum will issue in a continuous bar or thread, and thereby it is possible for the operator to watch the overflow and determine whether the machine is being fed at the proper rate.

Having thus described my invention what I claim is:—

1. A machine for forming blanks of vulcanizable material comprising a stationary die, means for progressively forcing the vulcanizable material through said die, a rotary die plate coacting with said die and having openings therethrough designed to register successively with said die and a closure member bearing against said plate opposed to said die and means for relieving the forcing means from excess pressure during the intervals when the die is closed by the die plate.

2. A machine for forming blanks of vulcanizable material comprising a cylinder having a die opening, means for progressively forcing the material from said cylinder through said die, and a rotary die plate having an annularly arranged series of mold cavities designed to successively register with the cavities of said die plate, said cyinder having a restricted by-pass for the plastic material.

3. A machine for forming blanks of vulcanizable material comprising a cylinder having a die opening, means for progressively forcing the material from said cylinder through said die, and a rotary die plate having an annularly arranged series of mold cavities designed to successively register with the cavities of said die plate, said cylinder having a constantly open by-pass for the plastic material.

4. In combination a tube machine having a die opening, a frame member secured to the cylinder of said tube machine, a rotary shaft slidably mounted in said frame member to one side of said die opening, a plate or disk removably carried by said shaft and having openings designed to register with said die opening, a pressure plate adjustably carried by said frame member and arranged to bear against said rotary plate opposite the die opening, and means for rotating the shaft in unison with the tube machine.

5. In combination a tube machine having a die opening, a frame member secured to the cylinder of said tube machine, a rotary shaft slidably mounted in said frame member to one side of said die opening, a plate or disk removably carried by said shaft and having openings designed to register with said die opening, a pressure plate adjustably carried by said frame member and arranged to bear against said rotary plate opposite the die opening, a bevel gear carried by said shaft, a bracket slidably carried by said frame member with means for locking it against movement, a second shaft journaled in said bracket having a bevel gear meshing with said first named gear, and a wheel carried by said second shaft having projections designed to register with the openings in said plate or disk.

6. In combination a tube machine having a die opening, a shaft journaled to one side of the axis thereof, a plate or disk carried by said shaft in juxtaposition to said die opening and having an annular series of openings to register successively therewith, a gear on said shaft, a counter shaft having a gear meshing with said first named shaft, stepped gears carried by said counter shaft, a second counter shaft parallel to said first named shaft, a yoke pivotally and slidably carried by said second counter shaft, a gear splined on said second shaft between the yoke arms, an idle gear carried by said yoke and meshing with said splined gear and means for swinging and sliding said yoke to cause said idle gear to selectively engage the stepped gears.

7. The combination with a tubing machine and its supporting pedestal of a supplemental frame member bolted to said tubing machine, a shaft journaled in said supplemental frame member, a disk carried by said shaft having die cavities, a presser plate coöperating with said disk, a second frame member bolted to the frame of the tubing machine, a second shaft journaled in said second frame, gearing between said first and second shafts, a counter shaft also journaled in said second frame, change speed gearing between said second shaft and counter shaft, and means for driving the tubing machine and counter shaft in unison.

In testimony whereof I affix my signature.

JAMES WILLIAM BRUNDAGE.